United States Patent
Noh et al.

(10) Patent No.: US 9,360,567 B2
(45) Date of Patent: Jun. 7, 2016

(54) SCINTILLATING ORGANIC MATERIALS AND METHODS FOR DETECTING NEUTRON AND GAMMA RADIATION

(75) Inventors: Youngwook Noh, Gainesville, FL (US); Richard T. Farley, Gainesville, FL (US); James K. Walker, Gainesville, FL (US)

(73) Assignee: NANOPTICS, INCORPORATED, Gainesville, FL (US)

( * ) Notice: Subject to any disclaimer, the term of this patent is extended or adjusted under 35 U.S.C. 154(b) by 121 days.

(21) Appl. No.: 14/130,050

(22) PCT Filed: Jun. 29, 2012

(86) PCT No.: PCT/US2012/045094
§ 371 (c)(1),
(2), (4) Date: Mar. 3, 2014

(87) PCT Pub. No.: WO2013/003802
PCT Pub. Date: Jan. 3, 2013

(65) Prior Publication Data
US 2014/0224993 A1    Aug. 14, 2014

Related U.S. Application Data

(63) Continuation-in-part of application No. 13/430,394, filed on Mar. 26, 2012, now Pat. No. 8,993,968.

(60) Provisional application No. 61/502,698, filed on Jun. 29, 2011, provisional application No. 61/482,485, filed on May 4, 2011, provisional application No. 61/467,613, filed on Mar. 25, 2011.

(51) Int. Cl.
*G01T 1/20* (2006.01)
*G01T 3/06* (2006.01)
(Continued)

(52) U.S. Cl.
CPC . *G01T 1/204* (2013.01); *C09K 9/02* (2013.01); *G01T 1/203* (2013.01); *G01T 3/06* (2013.01);
(Continued)

(58) Field of Classification Search
CPC ............ C09K 9/02; C09K 2211/1007; C09K 2211/1011; C09K 2211/1029; C09K 2211/1088; G01T 1/203; G01T 1/204; G01T 3/06
See application file for complete search history.

(56) References Cited

U.S. PATENT DOCUMENTS 3,010,908 A    11/1961  Broderick et al.
3,960,756 A    6/1976   Noakes
(Continued)

FOREIGN PATENT DOCUMENTS

EP    0 606 732    7/1994

OTHER PUBLICATIONS

Ait-Boubker, S., et al., "Thermal neutron detection and identification in a large volume with a new lithium-6 loaded liquid scintillator," *Nuclear Instruments and Methods A*, May 1, 1989, vol. 27, pp. 461-466.
(Continued)

*Primary Examiner* — Mark R Gaworecki
(74) *Attorney, Agent, or Firm* — Saliwanchik, Lloyd & Eisenschenk

(57) ABSTRACT

Embodiments incorporate a method and apparatus for detection of radiation. Embodiments detect fast and/or thermal neutrons. Embodiments detect neutrons in high backgrounds of gamma rays. Embodiments can have high sensitivity and/or high gamma discrimination. Embodiments include a given single material that detects fast neutrons and simultaneously detect gamma rays with moderate energy resolution. Embodiments utilize liquid, viscous liquid, gel, and/or solid scintillating materials. Embodiments incorporate a scintillating matrix, such as a liquid, having a highly polar matrix, such as a liquid solvent, dissolved dyes, and a high concentration of a dissolved organo metallic compound. The use of a single material for a large area detector of fast neutrons and gamma rays can provide material and cost benefits.

60 Claims, 3 Drawing Sheets

(51) Int. Cl.
C09K 9/02 (2006.01)
G01T 1/204 (2006.01)
G01T 1/203 (2006.01)

(52) U.S. Cl.
CPC . C09K 2211/1007 (2013.01); C09K 2211/1011 (2013.01); C09K 2211/1029 (2013.01); C09K 2211/1088 (2013.01)

(56) References Cited

U.S. PATENT DOCUMENTS

| | | | |
|---|---|---|---|
| 4,495,084 | A | 1/1985 | Shimizu et al. |
| 4,594,179 | A | 6/1986 | Harrah et al. |
| 4,657,696 | A | 4/1987 | Thomson |
| 5,298,189 | A | 3/1994 | Kauffman |
| 5,420,197 | A | 5/1995 | Lorenz et al. |
| 5,606,638 | A | 2/1997 | Tymianski et al. |
| 2004/0104500 | A1 | 6/2004 | Bross et al. |
| 2005/0224720 | A1 | 10/2005 | Dai et al. |
| 2011/0095231 | A1 | 4/2011 | Dai et al. |
| 2011/0315885 | A1 | 12/2011 | Cherepy et al. |
| 2012/0241630 | A1 | 9/2012 | Walker et al. |

OTHER PUBLICATIONS

Benniston, A.C., et al., "Intramolecular Delayed Fluorescence as a Tool for Imaging Science: Synthesis and Photophysical Properties of a First-Generation Emitter," *Chemistry of Materialsl*, 2007, vol. 19, pp. 1931-1938.

Benniston, A.C., et al., "Intramolecular Excimer Formation and Delayed Fluorescence in Sterically Constrained Pyrene Dimers," *Chemistry: A European Journal*, May 25, 2007, vol. 13, No. 16, pp. 4665-4674.

Bohne, C., et al., "Characterization of the Triplet-Triplet Annihilation Process of Pyrene and Several Derivatives under Laser Excitation," *Journal of the America Chemical Society*, May 1990, vol. 112, No. 11, pp. 4226-4231.

Brooks, F.D., et al., "Pulse Shape Discrimination in a Plastic Scintillator," *IRE Transactions on Nuclear Science*, 1960, vol. 7, Nos. 2-3, pp. 35-38.

Fisher, B.M., et al., "Fast neutron detection with 6Li-loaded liquid scintillator," *Nuclear Instruments and Methods A*, vol. 646, 2011, pp. 126-134.

Flaska, M., et al., "Digital Pulse Shape Analysis for the Capture-Gated Liquid Scintillator BC-523A," *Nuclear Instruments and Methods in Physics Research A*, Feb. 2009, vol. 599, Nos. 2-3, pp. 221-225.

Güsten, H., et al., "Photophysical Properties of Fluoranthene and Its Benzo Analogues," *Journal of Photochemistry*, 1982, vol. 18, No. 1, pp. 9-17.

Hull, G., et al., "New Organic Crystals for Pulse Shape Discrimination," *IEEE Transactions on Nuclear Science*, Jun. 2009, vol. 56, No. 3, pp. 899-903.

Kouzes, R.T., et al., "Status Summary of $^3$He and Neutron Detection Alternatives for Homeland Security," Pacific Northwest National Laboratory, Richland, WA, PNNL-19360.

McKinsey, D.N., et al., "Fluorescence Efficiencies of Thin Scintillating Films in the Extreme Ultraviolet Spectral Region," *Nuclear Instruments and Methods in Physics Research B*, Nov. 1997, vol. 132, No. 3, pp. 351-358.

Newhouse, E. I. "Fractal-Like Energy Transport and Fusion in a Naphthalene-Doped Polymeric Glass" *Journal of Luminescence*, 1984, pp. 651-653, vol. 31 & 32.

Venditto, V. et al. "Orientation and Microenvironment of Naphthalene Guest in the Host Nanoporous Phase of Syndiotactic Polystyrene" *Macromolecules*, 2005, pp. 3696-3702, vol. 38.

Delaunay, "Neutron Detector Developments at LPC Caen b-delayed Neutron Detectors," http://www.slidefinder.net/d/_delaunay/delaunay/13688226, Sep. 2007, SlideFinder.

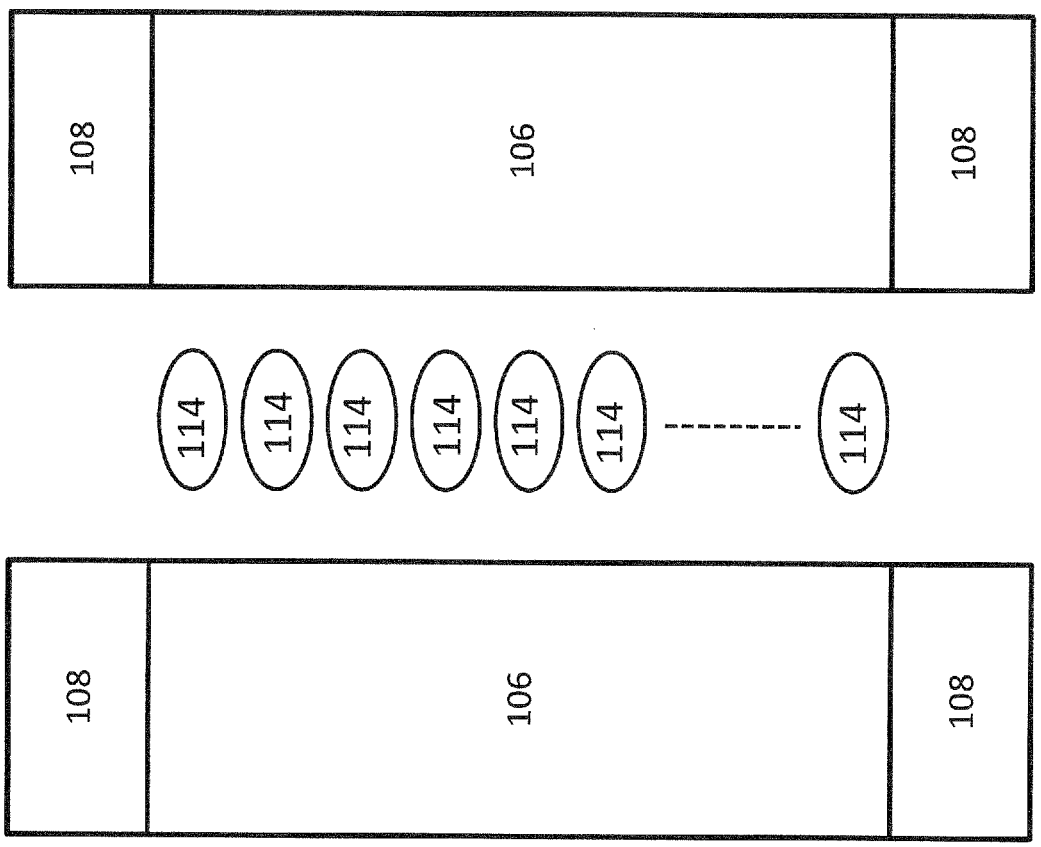

SCINTILLATING ORGANIC MATERIALS AND METHODS FOR DETECTING NEUTRON AND GAMMA RADIATION

CROSS-REFERENCE TO RELATED APPLICATIONS

The present application is the U.S. National Stage Application of International Patent Application No. PCT/US2012/045094, filed on Jun. 29, 2012, which claims the benefit of U.S. Provisional Patent Application Ser. No. 61/502,698, filed Jun. 29, 2011, and is a continuation-in-part of U.S. application Ser. No. 13/430,394, filed Mar. 26, 2012, which claims the benefit of U.S. Provisional Application Ser. No. 61/467,613, filed Mar. 25, 2011, and U.S. Provisional Application Ser. No. 61/482,485, filed May 4, 2011, the disclosures of all of which are hereby incorporated by reference in their entirety, including any figures, tables, or drawings.

TECHNICAL FIELD

The present invention relates to methods and apparatus, and liquid, gel, and solid organic scintillator materials, which can be used to detect radiation and, in particular, to detect gamma rays and fast and/or thermal neutrons, and provide good discrimination between the types of particles.

BACKGROUND OF INVENTION

Scintillation materials have been used for the detection of radiation. Plastic scintillators are used to detect the presence of ionizing radiation in applications such as detection of illegal transport of radioactive and fissile material, monitoring and safeguarding nuclear stockpiles, service of nuclear-nonproliferation, operation of nuclear research and power reactors, monitoring the use of medical and industrial isotopes, and in high energy, cosmic, and nuclear basic research. Plastic scintillators have been found to be efficient in detecting fast neutrons. However, plastic scintillators, to date, have shown little value for applications involving the detection of fast or thermal neutrons in the presence of background gamma rays. The detection of neutrons is important because they are strongly indicative of the presence of fissile material, such as plutonium and enriched uranium.

Ionizing radiation energy deposited in a scintillator material is typically converted into light. This light can then be measured by photo-sensitive detectors. Generally, incident penetrating radiation includes high-energy particles such as neutrinos, weakly interacting particles of all kinds, and ionizing radiation such as x-rays, gamma rays, alpha and beta particles, and fast and thermal neutrons.

U.S. patent application Ser. No. 13/430,394, discloses a plastic material composition that permits detection of fast and thermal neutrons. U.S. patent application Ser. No. 13/430,394, is incorporated by reference in the present application in its entirety.

A recent review of neutron detection technologies is Kouzes R. T. and Ely J. H., 2010; "Status Summary of 3He and Neutron Detection Alternatives for Homeland Security" PNNL-19360, Pacific Northwest National Laboratory, Richland, Wash. Despite great effort having been expended by many researchers, there is no efficient, very large area, low cost neutron detection technology available. Organic liquid scintillators have been employed to detect fast and thermal neutrons. For these detectors, the discrimination against gamma rays is achieved with the use of pulse shape discrimination (PSD). In this method, the gamma ray and neutron induced scintillation pulses are distinguished by the unique temporal signal characteristics of the scintillation pulse. A recent review of progress in PSD in boron loaded liquid scintillators has demonstrated that the technique has become very powerful for small detectors using commercially available liquid scintillators; see Mark Flaska and Sara A. Pozzi, Nuclear Instruments and Methods in Physics Research, Vol. 599, Issue 2-3, 221-225 (2009). However, the method suffers from two significant disadvantages. The low scintillation light yield resulting from neutron capture by boron imposes a severe upper limit to the size of a detector. All current commercially available neutron sensitive liquid scintillators contain boron. Also, there are major safety concerns in using large volumes of toxic, flammable, liquids at port and border locations. For these two reasons, large area, liquid scintillators have not been deployed at such locations.

Existing Portal Monitors have used polyvinyltoluene (PVT) plastic scintillator to measure gamma ray flux with essentially no energy resolution. In addition, a small area (about 0.5 m$^2$) sodium iodide detector has provided moderate energy resolution (10% at 660 keV) for the detection of gamma rays. Thus, there is a continuing need for a gamma ray detection system to reliably detect even lightly shielded Special Nuclear Material (SNM).

In summary, there is a need for a large area, robust, economical detector material and system that can detect both fast and thermal neutrons and also gamma rays with a moderate energy resolution. The use of a single material, coupled to a single photosensitive readout and associated electronics, will provide an economical solution to the problem of detecting Special Nuclear Material.

It is well known that the detection sensitivity to fissile material can be increased by exposing the shipping container to an external beam of gamma rays or neutrons. Known as active interrogation, this process creates a relatively high radiation exposure to the container and its surroundings. For this type of application, it is desirable that the detection system has a high count rate capability, very high gamma discrimination, and good resistance to damage from elevated radiation levels.

In summary, there is a continuing need to have a single, large area, cost effective, robust, bright scintillating material that offers methods and systems for detecting one or more of the following:

1) fast neutrons, with good discrimination against gamma rays;

2) gamma rays, with moderate energy resolution (<15% FWHM at 660 keV); and 3) thermal neutrons, with good discrimination against gamma rays.

In addition, these detection systems should exhibit high count rate ability, good radiation resistance, low-toxicity, low-flammability, and long-term stable operation.

BRIEF SUMMARY

Features and advantages of embodiments of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and embodiments of the invention cover all modifications, equivalents, and alternatives falling within the spirit and scope of the invention.

Embodiments of the invention pertain to a method and apparatus for detection of radiation. Specific embodiments relate to the detection of neutrons, such as fast and/or slow, or thermal, neutrons. Further specific embodiments are directed to detection of neutrons in high backgrounds of gamma rays. Embodiments can have high sensitivity and/or high gamma discrimination. Further embodiments can include a given single material that can detect fast neutrons and simultaneously detect gamma rays with moderate energy resolution. Embodiments of the invention also pertain to liquid, viscous liquid, gel and solid scintillating materials. A specific embodiment relates to a scintillating matrix, such as a liquid, having a highly polar matrix, such as a liquid solvent, dissolved dyes, and a high concentration of a dissolved organo metallic compound, such as triphenylbismuth (U.S. Patent Application No.:US 2011/0315885 A1 described the efficacy of using triphenylbismuth in a plastic scintillator for detecting gamma rays). When using this scintillating material, fast neutrons can be detected with good gamma ray discrimination, and also gamma rays can be efficiently detected with moderate energy resolution. The use of a single material for a large area detector of fast neutrons and gamma rays provides major material and electronic cost benefits and a reduction of the Portal Monitor's foot print area.

A specific embodiment relates to a scintillating matrix having a highly polar matrix, dissolved dyes, and a high concentration of lithium. Specific embodiments can incorporate organic dyes and/or can have lithium concentrations of up to, or about, a factor of ten higher than achieved in previous scintillating material compositions. Specific embodiments have lithium metal concentration above 0.2%, 0.3%, 0.4%, 0.5%, 0.6%, 0.7%, 0.8%, 0.9%, 1%, 1.1%, 1.2%, 1.3%, 1.4%, and 1.5% wt/wt. When using this scintillating material, upon a thermal neutron being captured by a lithium nucleus, nuclear fragments are emitted that produce a factor of 5 to 7, or a factor of 5 to 10, brighter scintillation pulse than that from existing commercially available boron loaded liquid scintillators. In embodiments in which lithium is used, a clear peak in the scintillation output intensity at about 540 keV electron equivalent energy is observed.

In one embodiment, the highly polar matrix is a liquid. The highly polar liquid solvent can be selected from the most powerful class of known solvents. These liquids are colorless, aprotic, highly polar non-aromatic liquids, which can dissolve polar and non-polar compounds and organic and inorganic salts.

The general advantages to the use of these highly polar solvents are at least two-fold. They have high solubility for many inorganic salts, including lithium and transition metal nitrates, cyanides and dichromates. Indium and Gadolinium are two metals that have been used in liquid scintillator in the past and could benefit from the use of highly polar solvents. In addition, these solvents are miscible with most organic liquids and can solubilize many organic solids, including a high concentration of base dye and easily dissolve small quantities of solid primary and secondary dyes. These solvents also have low toxicity and a high flash point. There is a reduced need, or no need, for the use of mineral oil to increase the flash point, as is done in many scintillation cocktails. In most cases, there is a reduced need, or no need, to use surfactants to permit the simultaneous use of both metal salts and organic materials in the same solution. In the past, surfactants have sometimes led to unacceptable optical absorption in large detectors.

Previous attempts to dissolve lithium salts into the aromatic, non-polar solvents of conventional liquid scintillators have achieved lithium ion concentrations of up to 0.15% wt/wt in commercial products. Because of this low concentration, lithium loaded liquid scintillator has not had acceptable thermal neutron detection sensitivity, and as a result, there is no commercial product. In the present invention, lithium salts have been shown to be soluble at more than 10% wt/wt in a polar solvent. This concentration can provide 0.5-1.5%, and/or 1-1.5%, wt/wt of lithium ions in solution. For a given 1 inch diameter tube size, this concentration provides thermal neutron sensitivity greater than that of the presently used $^3$He tubes.

One or more solid or liquid dyes can be dissolved in the polar solvent with one dye at high concentration, preferably at least 5% wt/wt, more preferably 10 to 30% wt/wt, and most preferably 10 to 40% wt/wt. These high concentrations of the base dye confer the property of Pulse Shape Discrimination as taught by U.S. application Ser. No. 13/430,394. A material composition of this type can produce a scintillation light intensity for a given energy loss comparable to that from conventional liquid scintillator. Quenching of the scintillation intensity by the polar liquids and free ions can reduce the light output by typically a factor of up to two, or in some cases, up to three.

For thermal neutron detection in a high flux of gamma rays, it is advantageous to employ one or both of the following two techniques of gamma discrimination: detect the large pulse height peak associated with neutron capture by lithium; and Pulse Shape Discrimination (PSD). In this way, gamma discrimination of at least 100,000:1 can be achieved. Fast neutrons can be detected by the capture gated method with background rejection >1,000,000:1 and/or by PSD of the recoil proton from neutron scattering. In addition, because of the high Li-6 ion concentration, a high detection efficiency of thermal neutrons can be obtained. In a specific embodiment, with a high concentration of Li-6 ions, a tube having a diameter of at least 1 cm, 1.5 cm, 2 cm, or 2.5 cm and containing the scintillating material can have a high detection efficiency. In this case, a high quantum efficiency (>80%) solid state photosensitive detector can be used to detect the scintillation light. As a result, high detection efficiency of thermal neutrons can be achieved with excellent gamma rejection.

In another embodiment of the invention, the highly polar matrix is solid. The highly polar solid can be selected from the class of transparent amorphous polymers, including polyvinylpyrrolidone (PVP), polyacrylamide (PAM), polyvinyl caprolactam (NVC), and polyvinyl imidazole. These materials can dissolve lithium salts and contain at least 1% Li wt/wt and simultaneously dissolve necessary organic base, primary and secondary dyes. These materials can safely be deployed at border crossings.

In one embodiment of the invention, the solid polymer employs gamma ray discrimination via Direct Energy Transfer by Electron Exchange (DETEE) between triplet states, which leads to delayed scintillation light, as disclosed in U.S. application Ser. No. 13/430,394. The time constant for the delayed light can be controlled and made similar to that obtained in diffusion limited trip-triplet annihilation in a liquid matrix. PSD for thermal (fast) neutrons can provide $10^5$:1 (>$10^3$:1) when DETEE is employed.

In a further embodiment of the invention, the highly polar matrix is a gel. The gel can be made using a gelling agent in the solution in a manner well known in the art.

In a further embodiment of the invention, the highly polar matrix is a high viscosity liquid. The high viscosity is achieved by dissolving a few percent wt/wt of very high molecular weight polar polymer in the solution. This type of matrix can dissolve the necessary amounts of lithium and organic aromatic dyes. PSD can occur by a combination of diffusion and DETEE processes in the gel. Furthermore, the material is extremely safe, stable, easily contained and can be deployed in large area.

Embodiments of the scintillator material compositions and methods can provide efficient and safe deployment of large area detection systems of Special Nuclear Material (SNM) in both passive and active modes.

BRIEF DESCRIPTION OF THE DRAWINGS

FIG. 3 depicts a schematic of the scintillation material whose composition provides the ability to detect gamma rays and fast neutrons in scintillating material 106 and thermal neutrons in scintillating material 114.

DETAILED DESCRIPTION OF THE INVENTION

Figure 1:
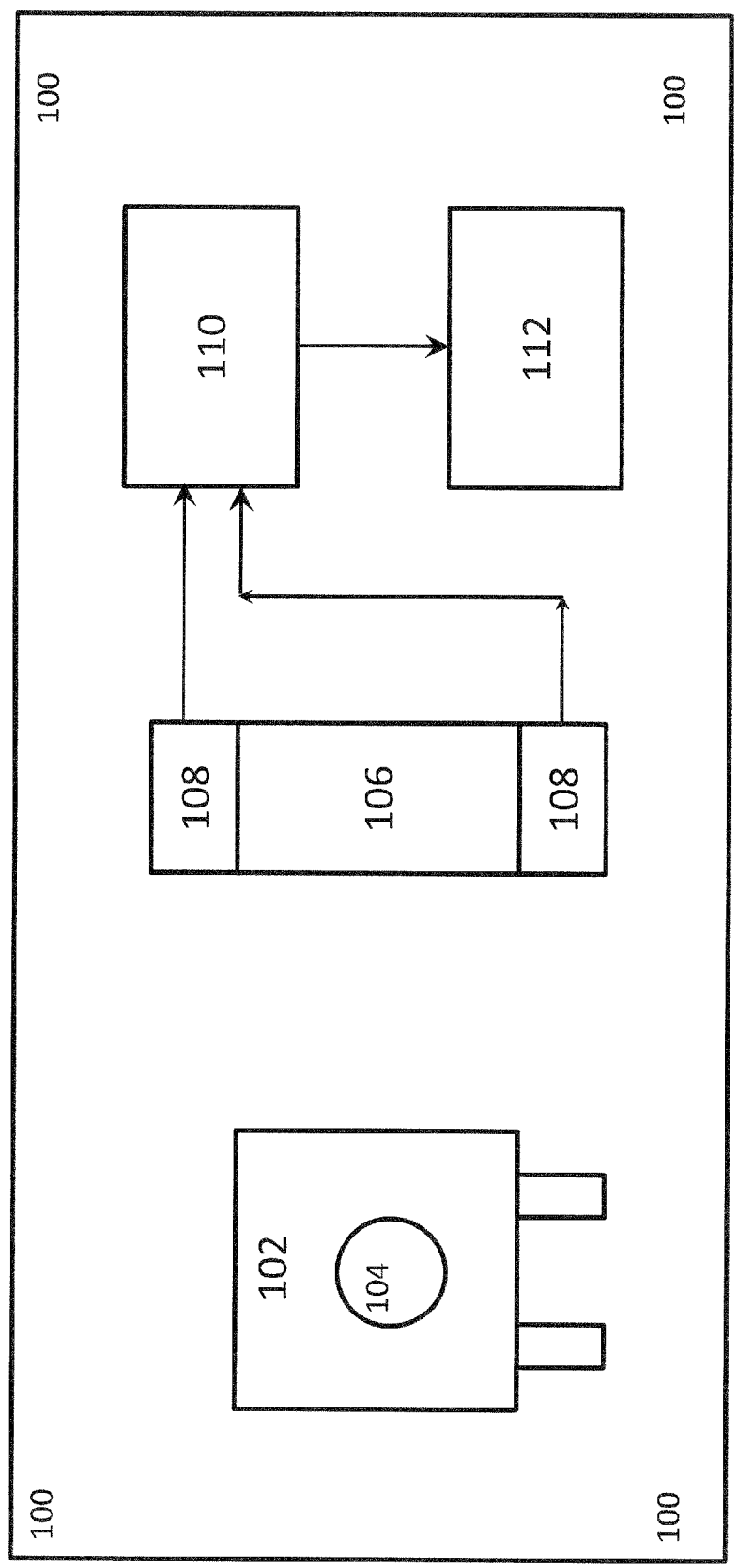
FIG. 1 depicts a schematic of the scintillation detection system in close proximity to a radioactive source located in a container.

Embodiments of the invention pertain to a method and apparatus for detection of radiation. FIG. 1 depicts a specific embodiment of the system 100, where a radioactive source of material 104 is within a container 102. In a specific embodiment, container 102 is moved past a radiation detection material 106. The scintillating material 106, such as a type described herein, is connected to photosensitive devices 108. The signals, such as electronic pulses, generated by the photosensitive devices are analyzed by, for example, a processor 110. The results of the analysis of the signals, which can provide an indication of the presence of radiation, can be provided. In an embodiment, the results are displayed by a visual display or device 112. Operators can then be informed when radiation is detected. Specific embodiments relate to the detection of gamma rays and neutrons, such as fast and/or thermal neutrons.

Figure 2:
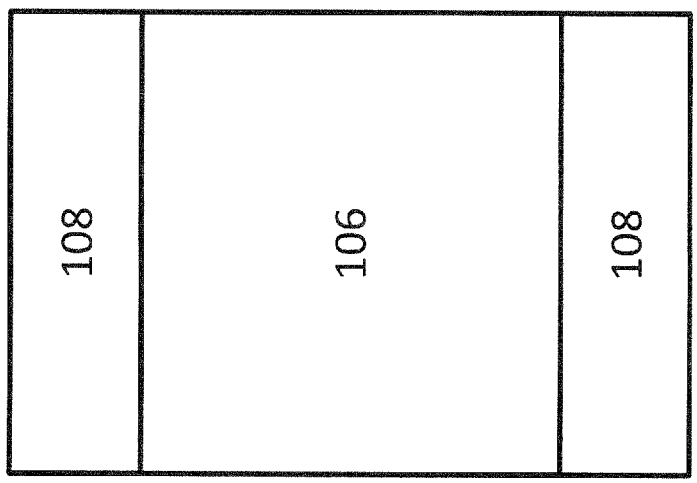
FIG. 2 depicts a schematic of the scintillation material whose composition is uniform and provides the ability to detect gamma rays and fast and thermal neutrons.

In one embodiment, depicted in FIG. 2, the scintillator material 106 has a uniform composition and emits light that is detected by photosensitive devices 108. This scintillator system permits the detection of gamma rays and fast and thermal neutrons.

A further specific embodiment, depicted in FIG. 3, where the scintillator material 106 provides the ability to detect gamma rays and fast neutrons. The scintillator material depicted as 114 provides the ability to detect thermal neutrons. In this embodiment the scintillation light from material 114 can be detected by a solid state device with 80% quantum efficiency for optimum gamma discrimination.

Some embodiments of the invention pertain to liquid scintillating materials. A specific embodiment relates to a scintillating liquid having a highly polar liquid solvent, dissolved organometallic compound such as triphenylbismuth, dissolved dyes, and a concentration of lithium salt. Specific embodiments can incorporate organic dyes and/or can have lithium concentrations of about a factor of ten higher than achieved in previous scintillating cocktails. Specific embodiments have lithium metal ion concentration above 0.2%, 0.3%, 0.4%, 0.5%, 0.6%, 0.7%, 0.8%, 0.9%, 1%, 1.1%, 1.2%, 1.3%, 1.4% and 1.5% wt/wt. When using this scintillating liquid, upon a thermal neutron being captured by a lithium nucleus, nuclear fragments are emitted that produce a factor of 6 times brighter scintillation pulse than that from existing boron loaded liquid scintillators. In a specific embodiment, a clear peak at about 540 keV electron equivalent energy is observed.

Embodiments of liquid scintillating materials can have compositions containing at least the following:

1) one or more polar liquids;
2) one or more organometallic compounds such as triphenylbismuth
3) one or more compounds containing lithium, preferably isotope $^6$Li; and
4) one or more solid or liquid organic dyes.

The polar liquid can be selected from the class of highly polar organic solvents that are aprotic and are among the strongest, if not the strongest, known solvents. Important physical and chemical properties of three members of this class of solvents are displayed in Table 1.

TABLE 1

Three Highly Polar Organic Solvents

| Compound | 1,3 Dimethyl 2-Imidazolidone (DMI) | Dimethyl Sulfoxide (DMSO) | Methyl-pyrrolidone (NMP) |
| --- | --- | --- | --- |
| Cas# | 80-73-9 | 67-68-5 | 872-50-4 |
| Structure | | | |
| Molecular Weight | 114.14 | 78.13 | 99.13 |
| Specific Gravity ($H_2O = 1$) | 1.05~1.06 | 1.0955 | 1.028 |
| Boiling Point (° C.) | 225/760 mm Hg | 189/760 mm Hg | 202 |
| Melting Point (° C.) | 8.2 | 18.5 | −24 |
| Refractive Index (N25D) | 1.47 | 1.4768 | 1.47 |
| Viscosity (cp/25° C.) | 1.944 | 2 | 1.66 |
| Miscibility with water | miscible | 25 g/100 g $H_2O$ | miscible |
| Flash Point (° C.) (Open cup) | 120 | 95 | 91 (Closed Cup) |
| Transport (UN Hazard Class) | Not Regulated | Not Regulated | Not Regulated |
| Toxicity | Low Level | Low Level | Low Level |

The three solvents in Table 1 have boiling points over 150° C., and have boiling points of at least over 189° C. They are colorless, optically transparent, have good chemical stability below 150° C., flash points of at least 91° C., and have low toxicity. The optical transparency of the base solvent is of particular importance for its use in a large area liquid scintillator based detector. An attenuation length of more than two meters for wavelengths longer than 400 nm has been measured for DMSO and DMI.

The intensity of scintillation light generated upon neutron capture by lithium loaded liquid scintillators has been measured most recently by B. M. Fisher et al. "Fast neutron detection with $^6$Li loaded liquid scintillator" Nucl. Inst. and Meth. A 646 (2011) 126-134. The measured electron-equivalent energy of the scintillation light is 540 keV, which is 5 to 7 times greater than that from neutron capture by boron. This is a major motivation for the use of lithium.

In an attempt to increase the Li content in scintillator to about 1% wt/wt, U.S. Published Patent Application No. 20110095231 teaches the use of lithiated nanoparticles in liquid scintillator. However, light scattering by the nanoparticles limits the use of that technique to small scale detectors.

Having the lithium compound dissolved in the solvent improves optical transmission. Salts of lithium can have a variety of properties, including one or more of the following: many salts of lithium are very chemically reactive; others are extremely insoluble; some are not produced in high volume and are, therefore, expensive to use at high concentration; and others have elements with moderate to high atomic numbers, causing quenching of the scintillation light. However, a number of organic and inorganic lithium salts can be utilized with embodiments of the subject invention. Some of the lithium compounds that can be utilized with embodiments of the invention are listed in Table 2. The percentage by weight of lithium in each salt is shown. The measured maximum solubilities of some of these compounds in DMI, DMSO, and water are shown in the fourth column. The achievable % wt/wt of lithium ions in a given polar solvent is shown in the final column. Embodiments can achieve a lithium ion concentration of 1% wt/wt, and preferably >1% wt/wt in solution. It can be seen that some of the salts can provide the necessary lithium ion concentrations in the polar solution.

TABLE 2

Select Lithium Salts

| Compound | Molecular Weight | Percentage of Lithium in Compound | Solubility of Compound (wt %) DMSO | DIM | $H_2O$ | Percentage wt of Lithium in Solution DMSO | DIM | $H_2O$ |
|---|---|---|---|---|---|---|---|---|
| Lithium Carbonate $LiCO_3$ Cas#554-13-2 | 73.89 | 18.80 | | | 1.30 | | | 0.25 |
| Lithium Benzoate $LiC_7H_5O_2$ Cas#553-54-8 | 128.05 | 5.42 | | | 44.70 | | | 2.40 |
| Lithium Nitrate $LiNO_3$ Cas#7790-69-4 | 68.95 | 10.00 | 10.00 | | 70.10 | 1.00 | | 7.00 |
| Lithium Chloride LiCl Cas#7447-41-81 | 42.39 | 16.40 | 10.20 | >15.0 | 83.50 | 1.67 | 2.50 | 13.70 |
| Lithium Perchlorate $LiClO_4$ Cas#7791-03-9 | 106.39 | 6.52 | 31.50 | | 56.10 | 2.05 | | 3.70 |
| Lithium Chlorate $LiClO_3$ Cas#36355-96-1 | 90.39 | 7.68 | | | | | | |

The highly polar solvent base should preferably also be miscible with, or dissolve, a fluorescent compound. The fluorescent compound can act as the base scintillator at a concentration, for example, in the range 5 to 40% wt/wt. Examples of fluorescent compounds that can be utilized as a base scintillator dye are shown in Table 3. Pulse shape discrimination can be achieved by either diffusion limitation or by the DETEE process or a combination thereof.

TABLE 3

Candidate base dyes for use with the polar solvent.

| | Candidate Base Dye | Structure | Melting Point ° C. | Boiling Point ° C. | Flash Point ° C. | Light Output QE | Emission Max λ (nm) in Ethanol | Solubility * (mol/L) |
|---|---|---|---|---|---|---|---|---|
| 1 | p-Xylene Cas# 106-42-3 | $H_3C$–⟨benzene⟩–$CH_3$ | 13.2 | 138 | 25 | 0.4 | 295 | >1 |
| 2 | mixture of xylenes Cas# 1330-20-7 | | −47 | 138 | 30 | 0.25 | 295 | >1 |

TABLE 3-continued

Candidate base dyes for use with the polar solvent.

| | Candidate Base Dye | Structure | Melting Point ° C. | Boiling Point ° C. | Flash Point ° C. | Light Output QE | Emission Max λ (nm) in Ethanol | Solubility * (mol/L) |
|---|---|---|---|---|---|---|---|---|
| 3 | pseudocumene PC Cas# 135-51-3 | 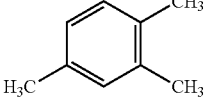 | −44 | 170 | 48 | 0.45 | 295 | >1 |
| 4 | Naphthalene (N) Cas# 91-20-3 | 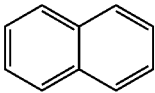 | 80 | 218 | 84 | 0.23 | 335 | >1 |
| 5 | 1-Methyl Naphthalene Cas# 90-12-0 | 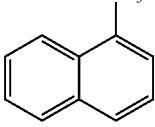 | −22 | 243 | 82 | 0.23 | ~335 | >1 |
| 6 | 2-Methyl Naphthalene Cas# 91-57-6 | 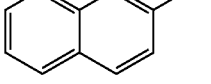 | 35 | 241 | 114 | 0.32 | ~335 | >1 |
| 7 | Di isopropyl Naphthalene (DIN) Mixture of isomers | 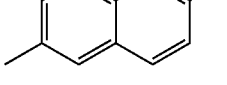 | <5 | | | ~0.23 | ~335 | >1 |
| 8 | 2,5 Diphenyloxazole (PPO) Cas# 92-71-7 | 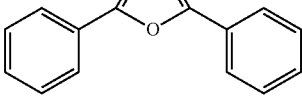 | 73 | 360 | 1 | | 362 | >1.5 |
| 9 | Pyrene Cas# 129-00-0 | 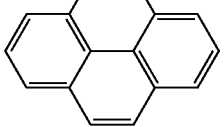 | 146 | 404 | non-flammable | 0.35 | 480 | >1 |

* Solubility is defined as mol/L of the base dye which is measured to be soluble in polystyrene Traditional materials, such as xylene and pseudocumene have low flash points and can be utilized to advantage with embodiments of the invention. Linear Alkylbenzene (LAB), Diisopropyl naphthalene (DIN), and preferably mixtures of isomers of the latter compound, are commonly used fluorescent bases in commercial liquid scintillator (see U.S. Pat. No. 4,657,696). Linear Alkylbenzene Sulfonate (LABS) has been evaluated recently (M. Yeh, Brookhaven National Laboratory, ANT-2010, Santa Fe, N. Mex.) as a fluorescent base in water liquid scintillation detectors for very large-scale neutrino and cosmic ray physics experiments. These compounds have several desirable features for this application, including the following: high light output, good quench resistance, and flash points greater than 130 C. They have been measured to be miscible in DMI and DMSO at a concentration of more than 20% wt/wt. A concentration of 20 to 40% wt/wt is typical for the base scintillating material in scintillating cocktails and specific embodiments of the subject invention use such a combination. It is desirable to have no dissolved oxygen in the cocktail, as such dissolved oxygen could quench the triplet states. In addition, the polar solvents are hygrophilic and water should preferably be prevented from entering the cocktail. Thus, all scintillating materials using the polar solvents should preferably be contained in such a way to minimize, or prevent, oxygen and water from entering the cocktail. Hermetic sealing is preferably used with respect to all scintillating organic materials exhibiting pulse shape discrimination. Examples of some early scintillation cocktails are described in, for example, Brian W. Fox "Techniques of sample preparation for liquid scintillation counting", North Holland Publishing Co.; Amsterdam 1976.

Embodiments of the scintillating liquid preferably contain at least one additional fluor, termed the primary fluor. Such fluors are well known in the art and include, for example, p-TerPhenyl (PTP) and 2,5-diphenyloxazole (PPO) and the choice of primary dye depends on the choice of the base scintillating compound. The primary dye absorption spectrum must match and/or overlap with the emission spectrum of the base scintillator. Concentrations of these fluors can be in the range 0.1 to 4% wt/wt in specific embodiments.

Embodiments of the scintillation cocktail may also contain a secondary fluor, examples of which are well known in the art. Such fluors include, for example, p-bis[2-(5-Phenyloxazolyl)]benzene (POPOP) and p-his(o-Methylstyryl)benzene (bis-MSB). Concentrations of these fluors can be in the range 0.001 to 0.1% wt/wt in specific embodiments.

A specific embodiment of a commonly used scintillation cocktail contains 30% wt/wt pseudocumene (PC), 69% wt/wt mineral oil, 1% wt/wt PPO, and 0.02% wt/wt POPOP. This cocktail can be regarded as a "Standard Cocktail" and has a scintillation yield of about 50% of the scintillation yield of anthracene when measured by the pulse height of the Compton edge using a Cesium gamma ray source.

In one embodiment of the invention, a cocktail was made containing 61% wt/wt DMI, 30% wt/wt DIN, 8% wt/wt LiCl, 1% wt/wt PPO, and 0.02% wt/wt POPOP. The calculated lithium ion concentration was 1.3% wt/wt. The solution was transparent and colorless. The scintillation light intensity was measured to be 45% that of the Standard Cocktail. A similar cocktail, but without LiCl, was made containing 69% wt/wt DMI 30% wt/wt DIN, 0% LiCl, 1% wt/wt PPO and 0.02% wt/wt POPOP. The scintillation light intensity was measured to be 80% that of the Standard Cocktail. It is concluded that the lithium chloride acts as a significant chemical quencher of the light yield.

In one embodiment of the invention, a cocktail was made containing 59% wt/wt DMI, 30% wt/wt DIN, 10% wt/wt Lithium nitrate (LiNO3), 1% wt/wt PPO, and 0.02% wt/wt POPOP. The calculated lithium ion concentration was 1% wt/wt. The solution was transparent and colorless. The scintillation light intensity was measured to be 55% that of the Standard Cocktail.

In one embodiment of this invention, pulse shape discrimination (PSD) is used to give discrimination against gamma ray interactions in the polar liquid scintillating cocktail. The shape of the scintillation pulse versus time is related to the ionization density of the charged particle(s) in the liquid. Neutron capture by a lithium nucleus creates highly ionizing particles: a triton with 2.05 MeV and an alpha particle with 2.73 MeV. Measurements of scintillation decay shape have been made using different lithium loaded liquid scintillators: S. Ait-Boubker et al. "Thermal Neutron Detection with a Lithium-6 Loaded Liquid Scintillator Nucl. Inst. and Meth. A 277 (1989) 461; Lithium-6 Loaded Liquid Scintillator, H. Ikeda, Tohoku University, ANT'09 Meeting Hawaii 2009/8/14; and B. M. Fisher et al. Fast neutron detection with Li-6 loaded liquid scintillator, Nucl. Inst. and Meth. A 646 (2011) 126-134. The results of Ait-Boubker et al. show excellent qualitative discrimination against gamma rays of at least $10^4$:1, at least $5\times10^4$:1, at least $8\times10^4$:1, at least $9\times10^4$:1, and/or at least $10^5$:1.

Specific embodiments of the present invention incorporate at least ten times the concentration of $^6$Li compared to that of previous scintillators. The signal of the neutron signal relative to gamma background can be correspondingly increased by an order of magnitude and increase the gamma discrimination by the same factor.

In one embodiment of this invention, thermal neutron detection is signaled by the alpha and triton particles producing a scintillation pulse peak at about 540 keV electron equivalent energy, the peak resolution being about 15% FWHMH. Discrimination of events outside the peak further increases the gamma ray discrimination.

In one embodiment of this invention, PSD is used to detect fast neutrons and give discrimination against gamma ray interactions in the liquid scintillating cocktail. The references quoted earlier demonstrate a gamma discrimination of about $10^3$:1 using PSD for recoil electrons from gamma interactions. If delayed neutron capture signals are demanded in addition to the recoil proton signal, gamma discrimination of more than $10^7$:1, $5\times10^7$:1, $8\times10^7$:1, $9\times10^7$:1, and/or 100,000, 000:1 can be attained.

In one embodiment of this invention, the ratio of delayed to prompt scintillation intensity is increased substantially, to effect a corresponding substantial increase in gamma discrimination.

The base scintillator can be chosen from a class of fluors that form dimers in the highly polar solvent of the scintillating cocktail. These dyes include, for example, naphthalene, pyrene, 2,1-naphthyl-5-phenyl-oxazole, perylene, and some derivatives thereof. Naphthalene and pyrene have been found to be soluble up to more than 20% wt/wt in DMI and DMSO.

At concentrations >1% wt/wt, pyrene has been found to exist as dimers in the above solvents and emit excimer emission at a peak of 485 nm with time constant of 45 nm. There is no need to use primary or secondary fluors due to the large Stoke's shift. The scintillating excimer emission has comparable intensity to the previously described scintillation cocktails of this invention at pyrene concentrations >10% wt/wt. Highly ionizing particles, such as tritons and alphas, have much greater chance than electrons of exciting a dimer of pyrene molecules into a pair of triplets. Subsequent annihilation of the triplets leads to delayed scintillation excimer emission at 485 nm from an excited singlet in the usual way. This process has been studied extensively using a strong laser for excitation of pyrene dimers: (C. Bohne et al. J. Am. Chem. Soc. 1990, 112, 4226-4231: and A. Benniston et al. Chem. Eur. J. 2007, 13, 4665-4674)

The time constant for the annihilation process has been found to be controllable by the addition of an alkyl substituent to the pyrene molecule, and can be made comparable or larger than the singlet excimer emission time constant. As a result, highly ionizing particles can be made to give an intense scintillating pulse in a time window extending from 50 to 200 ns after the prompt emission. The ratio of the delayed to prompt scintillating intensity is substantially greater than that from a minimum ionizing electron. PSD with this type of scintillation cocktail provides improved gamma ray discrimination.

In another embodiment of this invention, the ratio of delayed to prompt scintillation intensity is increased substantially, to effect a corresponding substantial increase in gamma discrimination.

The base scintillator can be chosen from a class of fluors that have two chromophores covalently bonded to one another, at a distance from each other such that they have a designed annihilation rate constant. Control of the annihilation rate is typically achieved by the use of bulky alkyl substituents on one or both of the chromophores.

Dual chromophore fluors of this type have been synthesized and studied experimentally (A. Benniston et al. Chem. Mater. 2007, 19, 1931-1938 and A. Benniston ibid). The base scintillator has a concentration of 1 to 15% wt/wt in the scintillating cocktail. The prompt scintillation decay time constant of the chromophores is designed to be in the range 1 to 20 nanoseconds. As in the previous embodiment, the ratio of the delayed scintillating intensity from neutron capture is substantially greater than that from a minimum ionizing electron. PSD with this type of scintillation cocktail provides improved gamma ray discrimination.

In specific embodiments of the invention, the following components of a cocktail can be used in a variety of concentrations to achieve both acceptable scintillation light intensity and a metal concentration that is more than an order of magnitude greater than previously achieved:

1. A highly polar solvent,
2. Lithium salt, or other metal salt, which has a good solubility in the polar solvent,
3. A base liquid or solid scintillator which has good miscibility or solubility in the polar solvent, and
4. The optional use of a primary and/or secondary dye at relatively low concentration and are easily solubilized in the polar solvent.
5. The use of an organometallic compound such as triphenylbismuth for the purpose of efficient detection of gamma rays and providing a moderate measurement of their energy.

In one embodiment of the invention, NMP solvent was used with 40% wt/wt of triphenylbismuth, 20% wt/wt of PPO, 0.4% wt/wt of Diphenylanthracene and 0.005% wt/wt of Coumarin 519. The emission was centered at 490 nm which is suitable for a green sensitive phototube. Gamma rays can be detected with good efficiency and moderate energy resolution. In addition, fast neutrons can be detected to give good PSD from gamma rays due to the high base dye concentration.

In another embodiment of the invention, the highly polar matrix is a solid. The highly polar solid can be selected from the class of transparent polymers including polyvinylpyrrolidone (PVP), polyacrylamide (PAM), polyvinylimidazolidone and polyethylene oxide (PEO). The monomer N-Vinylpyrrolidone and the polymer is shown in Table 4 along with some properties.

TABLE 4

Properties of vinyl and polymer candidates for the polar solid.

| | Monomer | Polymer |
|---|---|---|
| Compound | N-Vinyl-2-Pyrrolidone | Polyvinylprrrolidone |
| Cass# | 88-12-0 | 9003-39-8 |
| Structure | | |
| Density (g/ml) | 1.043 | 1.2 |
| Melting Pt. (° C.) | 13.6 | 150-180 (glass temp) |
| Flash Pt. (° C.) | 95 | n/a |
| Boiling Pt, at 13 mbar (° C.) | 90-92 | n/a |
| Hygroscopic | Yes | up to 40% wt/wt |
| Optical | Optically Transparent | Optically Transparent |
| Refractive Index | 1.47 | 1.52 |
| Explosive | No | No |
| Spontaneous Flammability | No | No |
| Combustible | Yes | Yes |

These polymeric materials can dissolve lithium salts while simultaneously dissolving the necessary organic base, primary and secondary dyes. However, the solubility of these solutes in the polymer is in the range of 60% to 80% of the corresponding solubilites in the monomer.

In one embodiment of the invention, solid PVP was made containing 30% wt/wt triphenyl bismuth, 18% PPO, 0.4% diphenylanthracene and 0.005% wt/wt of coumarin 519. Advantageously, these solid scintillation materials can be safely deployed in border crossings. Thus, there is a compromise between detection efficiency and safety in the case of solid polar scintillation materials.

In one embodiment of the invention, the solid polar polymer provides neutron detection with gamma ray discrimination via Direct Energy Transfer by Electron Exchange (DETEE) between triplet states, which leads to delayed scintillation light. The time constant for the delayed light can be controlled and made similar to that obtained in diffusion limited triplet-triplet annihilation in a liquid matrix. The use of DETEE for providing PSD in a solid is described in U.S. patent Ser. No. 13/430,394 which is incorporated by reference in the present application in its entirety. PSD for thermal fast neutrons can provide gamma discrimination of $10^5:1$ ($>10^3:1$) when DETEE is employed.

The high glass transition temperature (150°-180° C.) of polyvinylpyrollidone (PVP) assists in providing acceptable mechanical and thermal properties to the polymer even after adding 40% wt/wt triphenylbismuth and 20% wt/wt of base dye, 2,5 Diphenylloxazole (PPO) to the polymer. It has also been found to be advantageous to lightly cross-link the PVP to ensure excellent mechanical and thermal properties of the material. This scintillating material provides the ability to detect fast neutrons with good gamma discrimination and the detection of gamma rays with moderate energy resolution.

In another embodiment of the invention the scintillating material described above for fast neutron and gamma detection can also be used for thermal neutron detection. Because the scintillating material is several inches thick to obtain good neutron and gamma detection efficiency, a lithium salt dissolved at a concentration of 5 to 10% wt/wt can provide excellent thermal neutron detection efficiency, even with inexpensive, unenriched lithium. Other advantages of the use of PVP are 1) the monomer is commercially produced in highly pure form in large quantities, 2) the monomer has an optical attenuation length greater than 2 meters at greater than 350 nm, and 3) bulk thermal polymerization and cross-linking are easily performed.

Another embodiment of this invention relates to the transformation of a liquid scintillator composition into a transparent viscous material with a controllable viscosity. The viscous matrix can be selected from one of the highly polar liquids described previously which has dissolved within it <5% wt/wt of a very high molecular weight polar polymer of the type described previously. For example, Luvitec K90 powder (polyvinylpyrrolidone), from BASF, has a molecular weight of more than one million has been found to be useful in this regard. This type of matrix can dissolve the necessary amounts of lithium and organic aromatic dyes. The viscosity of the material can reach 1000 cp. The highly viscous scintillating material has essentially the same gamma and neutron detection properties as the polar liquids but offers considerably greater safety in deployment.

In another embodiment of this invention a solid gel material can be formed. There are various ways of forming solid gel materials from these polar solvent solutions. A review of some of these methods is given in U.S. Pat. No. 5,420,197. The development of gelling agents for DMSO, NMP and DMI has been a subject of intense development for many years. The procedure for preparing a DMSO, NMP or DMI based scintillator gel is similar to that used by pharmaceutical manufacturers who use these polar solvents for a variety of medical and cosmetic purposes. The DMSO, NMP or DIM composition can be initially prepared containing the desired combination of liquid, organometallic compound such as triphenylbismuth, one or more dyes, and a lithium compound. A typical gelling agent additive, such as Carbopol supplied by Lubrizol Corporation, can be sifted while stirring into the DMSO or DIM composition and allowed to disperse over 20 minutes. Warming the mixture to at least 50 C is helpful in dispersing and activating the gelling agent. Gelling can be completed in about one hour. Concentrations of different gelling agent can be used in the range 0.5% to 5% wt, and preferably in the range 0.5 to 2% wt. The selection of a particular gelling agent and its concentration can control the viscosity of the final gelled scintillator in the range 1 up to 100,000 cp. A high purity of the gelling agent is preferred to maintain good optical transmission of the gelled material scintillator composition.

In a further embodiment of the invention, the highly polar solid gel matrix is produced starting from the viscous liquid solution described earlier. A UV, radiation or thermally cross-linkable PVP polymer can be added at <3% wt/wt to the viscous solution to produce a transparent solid gel. The material is extremely safe, stable, easily contained, and can be deployed in a large area gamma plus neutron detector. If the physical container of the scintillating solid gel material is ruptured by being struck by a vehicle, the gel material will not spill or run from the container. In fact, specific embodiments of the gel material can retain its shape and integrity, thus providing a high degree of safety.

Embodiment 1

A scintillation system for detecting incident radiation, comprising:
a scintillator composition, wherein the scintillator composition comprises:
a matrix material;
base fluorescent dye molecules dissolved in the matrix material, wherein the matrix material with the base fluorescent dye molecules dissolved therein comprises base chromophores, wherein the base chromophores have a base chromophore average nearest neighbor distance in the range 0.5 to 12 Angstroms, wherein the base chromophores produce base scintillation light upon excitation, wherein the base scintillation has a base peak wavelength, wherein the base scintillation light has a base prompt time component and a base delayed time component, wherein an intensity of the base prompt time component and an intensity of the base delayed time component provide information so as to allow distinguishing between base scintillation light created by fast neutrons and base scintillation light created by gamma rays;
primary fluorescent dye molecules dissolved in the matrix material, wherein the primary fluorescent dye molecules absorb the base scintillation light and emit primary scintillation light, wherein the primary scintillation light has a primary peak wavelength, wherein the primary peak wavelength is longer than the base peak wavelength; and
organo metallic molecules dissolved in the matrix material, wherein a density and average atomic number of the scintillator composition is such that the scintillator composition is capable of containing a total energy of at least a portion of gamma rays incident on the scintillator system, wherein containing the total energy of a gamma ray incident on the scintillation system in the scintillator composition allows a determination of the total energy of the gamma ray incident on the scintillation system from an intensity of the base scintillation light.

Embodiment 2

The scintillation system according to embodiment 1, further comprising:
a metal salt dissolved in the matrix material, wherein selected metal nuclei of the metal salt capture a thermal neutron incident on the scintillation system and produce base scintillation light, wherein the intensity of the base scintillation prompt time component and the intensity of the base scintillation delayed time component allow detection of the thermal neutron captured by the selected metal nuclei of the metal salt.

Embodiment 3

The scintillation system according to embodiment 1, further comprising:
secondary fluorescent dye molecules dissolved in the matrix material, wherein the secondary fluorescent dye molecules absorb the primary scintillation light and emit secondary scintillation light, wherein the secondary scintillation light has a secondary peak wavelength, wherein the secondary peak wavelength is longer than the primary peak wavelength;

Embodiment 4

The scintillation system according to embodiment 2, further comprising:
secondary fluorescent dye molecules dissolved in the matrix material, wherein the secondary fluorescent dye molecules absorb the primary scintillation light and emit secondary scintillation light, wherein the secondary scintillation light has a secondary peak wavelength, wherein the secondary peak wavelength is longer than the primary peak wavelength;

Embodiment 5

The scintillation system according to any of embodiments 3, 4, and 46, wherein the secondary peak wavelength is a visible wavelength.

Embodiment 6

The scintillation system according to any of embodiments 1 to 4, and 45-53, further comprising a receiver, wherein the receiver receives and analyzes the secondary scintillation light from the scintillator composition and determines whether a gamma ray was incident on the scintillation system.

Embodiment 7

The scintillation system according to embodiment 6, wherein the receiver further determines an energy of the gamma ray incident on the scintillation system.

Embodiment 8

The scintillation system according to any of embodiments 1 to 4, and 45-53, wherein the receiver receives and analyzes the secondary scintillation light from the scintillator composition, wherein the receiver determines whether a fast neutron was incident on the scintillation system.

Embodiment 9

The scintillation system according to embodiment 8, wherein the receiver further determines an energy of recoil of one or more protons produced by the incident fast neutron.

Embodiment 10

The scintillation system according to any of embodiments 3, 4, and 46, wherein the receiver receives and analyzes the secondary scintillation light from the scintillator composition, wherein the receiver determines whether a thermal neutron interacted in the scintillation system.

Embodiment 11

The scintillation system according to any of embodiments 1 to 4, and 45-53, wherein the matrix material is a solid polymer, a liquid, a viscous liquid, a gel polymer, or a combination thereof.

Embodiment 12

The scintillation system according to any of embodiments 1 to 4, and 45-53, wherein the matrix material is sufficiently transparent to base scintillation light such that an attenuation length of the base scintillation light at the base peak wavelength is at least 0.5 m.

Embodiment 13

The scintillation system according to any of embodiments 1 to 4, and 45-53, wherein the matrix material is sufficiently transparent to base scintillation light such that an attenuation length of the base scintillation light at the base peak wavelength is at least 1.0 m.

Embodiment 14

The scintillation system according to any of embodiments 1 to 4, and 45-53, wherein the matrix material is sufficiently transparent to base scintillation light such that an attenuation length of the base scintillation light at the base peak wavelength is at least 1.5 m.

Embodiment 15

The scintillation system according to any of embodiments 1 to 4, and 45-53, wherein the matrix material is a solid polymer, wherein the solid polymer is an amorphous, solid polymeric material with glass transition temperature higher than 75° C.

Embodiment 16

The scintillation system according to embodiment 15, wherein the solid polymer comprises one or more materials selected from the group consisting of: polystyrene, polyvinyl toluene, polyvinyl xylene, polyvinyl naphthalene, polyvinylacenaphylene, polyvinylbiphenyl, polyvinylcarbazole, polyvinyldimethyl styrene, polyvinyltrimethylstyrene, polyvinylfluorene, and cyclic olefine copolymers.

Embodiment 17

The scintillation system according to embodiment 15, wherein the solid polymer is polar and comprises one or more materials selected from the group consisting of: polyvinylpyrrolidone, polyvinylimidazolidone, polyvinylsulfoxide and alkyl substituted compounds thereof.

Embodiment 18

The scintillation system according to embodiment 14, wherein the matrix material is a cross-linked polymeric material.

Embodiment 19

The scintillation system according to any of embodiments 1 to 4, and 45-53, wherein the matrix material is a liquid with melting point below 20° C., flash point above 90° C., low toxicity, and wherein the liquid is capable of dissolving a highly polar metal salt, aromatic organic dyes, and an organometallic compound.

Embodiment 20

The scintillation system according to embodiment 19, wherein the liquid comprises one or more materials selected from the group consisting of: highly polar solvents, methyl pyrrolidone (N-MP), dimethyl imidazolidone (DMI), dimethyl sulfoxide (DMSO), and derivatives thereof.

Embodiment 21

The scintillation system according to embodiment 20, wherein the matrix material is a polar liquid, wherein 1-3 percent wt/wt of a very high molecular weight soluble polymer is dissolved in the polar liquid, wherein the very high molecular weight soluble polymer increases a viscosity of the polar liquid by a factor in the range of 2 to 1000.

Embodiment 22

The scintillation system according to any of embodiments 1 to 4, and 45-53, wherein the matrix material is a highly viscous liquid, wherein the matrix material is contained in a mechanical structure.

Embodiment 23

The scintillation system according to any of embodiments 1 to 4, and 45-53, wherein the matrix material is a gel comprising a viscous liquid and a three-dimensional cross-linked polymeric network, wherein the gel does not flow.

Embodiment 24

The scintillation system according to embodiment 23, wherein the viscous liquid is selected from the group consisting of: a polar liquid, N-MP, and DMI, wherein the three-dimensional cross-linked polymeric network is selected from the group consisting of: linear and cross-linkable polymers based on polyvinylpyrrolidone (PVP) and polyvinylimidazolidone (PVI).

Embodiment 25

The scintillation system according to embodiment 24, wherein the gel is contained in a mechanical structure.

Embodiment 26

The scintillation system according to any of embodiments 1 to 4, and 45-53, wherein the matrix material is selected from the group consisting of: a gel, a high glass transition temperature solid polymer, and a cross linked polar solid polymer.

Embodiment 27

The scintillation system according to any of embodiments 1 to 4, and 45-53, wherein the base fluorescent dye molecules are aromatic dye molecules, wherein the base fluorescent dye molecules have a concentration in the range 0.3 to 3.5 mol/L.

Embodiment 28

The scintillation system according to any of embodiments 1 to 4, and 45-53, wherein the base fluorescent dyes comprises one or more dyes selected from the group of consisting of: pseudocumene, single ring aromatic compounds, and derivatives thereof.

Embodiment 29

The scintillation system according to any of embodiments 1 to 4, and 45-53, wherein the base fluorescent dyes comprises one or more dyes selected from the group of consisting of: diisopropyl naphthalene, two ring aromatic compounds, and derivatives thereof.

Embodiment 30

The scintillation system according to any of embodiments 1 to 4, and 45-53, wherein the base fluorescent dyes comprises one or more dyes selected from the group consisting of: p-terphenyl, 2,5 diphenyloxazole (PPO), dibenzofuran (PPF), and derivatives thereof, selected from the group of 3 ring aromatic compounds.

Embodiment 31

The scintillation system according to any of embodiments 1 to 4, and 45-46, wherein the primary dye molecules dissolved in the matrix material have an optical absorption overlapping with the emission maximum of the base fluorescent dye molecules, wherein a concentration of the primary dye molecules is in the range 0.1 to 3.5% wt/wt.

Embodiment 32

The scintillation system according to embodiment 31, wherein the primary fluorescent dye molecules comprises one or more dyes selected from the group consisting of: diphenylanthracene and bis-MSB.

Embodiment 33

The scintillation system according to embodiment 32, wherein the secondary fluorescent dye molecules comprises one or more dyes selected from the group consisting of: a coumarin dye and a rhodamine dye, wherein a concentration of the secondary fluorescent dye molecules is in the range 0.001 to 0.05% wt/wt.

Embodiment 34

The scintillation system according to any of embodiments 1 to 4, 47-48, and 50-51, wherein the organo-metallic molecules comprises one or more compounds selected from the group consisting of: tetramethyl tin, triphenyl bismuth, essentially covalent rather than ionic organo-metallic compounds, and derivatives thereof.

Embodiment 35

The scintillation system according to any of embodiments 2 or 4, 45, 46, 48, 49, 51, and 52, wherein the metal salt comprises one or more compounds selected from the group consisting of: lithium chloride, lithium nitrate, lithium salicylate, and compounds containing metal moieties with large neutron capture cross-sections, boron, and gadolinium.

Embodiment 36

The scintillation system according to embodiment 35, wherein the metal salt comprises one or more lithium compounds, wherein the lithium compounds are dissolved in the matrix material such that a lithium ion concentration is in the range 0.1% to 2.0% wt/wt.

Embodiment 37

The scintillation system according to embodiment 36, wherein the metal salt comprises a lithium salt, wherein the lithium salt has an enhanced concentration of the Li-6 isotope.

Embodiment 38

The scintillation system according to any of embodiments 1 to 4, and 45-53, wherein the matrix material has less than $10^{-4}$ wt/wt of oxygen dissolved therein.

Embodiment 39

The scintillation system according to any of embodiments 1 to 4, and 45-53, wherein the matrix material has less than $10^{-5}$ wt/wt of oxygen dissolved therein.

Embodiment 40

The scintillation system according to any of embodiments 1 to 4, and 45-53, wherein the matrix material has less than $10^{-3}$ wt/wt of water dissolved therein.

Embodiment 41

The scintillation system according to any of embodiments 1 to 4, and 45-53, wherein the scintillation system provides information sufficient to identify and measure the energy of a gamma ray such that the full width at half maximum of the energy spectrum is better than 15% of the energy at 0.662 MeV.

Embodiment 42

The scintillation system according to any of embodiments 1 to 4, and 45-53, wherein the scintillation system provides information to identify a fast neutron scatter from a proton event and discriminate against a gamma scatter from an electron with a factor of at least 300:1.

Embodiment 43

The scintillation system according to any of embodiments 1 to 4, and 45-53, wherein an energy spectrum of fast neutrons can be determined from a distribution of energy depositions of incident fast neutrons.

Embodiment 44

The scintillation system according to any of embodiments 1 to 4, and 45-53, wherein the scintillation system provides information to identify a slow or thermal neutron which is captured by 6-Lithium and discriminates against a gamma ray interaction with a ratio of at least $10^4:1$.

Embodiment 45

A scintillation system for detecting incident radiation, comprising:
a scintillator composition, wherein the scintillator composition comprises:
  a matrix material;
  base fluorescent dye molecules dissolved in the matrix material, wherein the matrix material with the base fluorescent dye molecules dissolved therein comprises base chromophores, wherein the base chromophores have a base chromophore average nearest neighbor distance in the range 0.5 to 12 Angstroms, wherein the base chromophores produce base scintillation light upon excitation, wherein the base scintillation has a base peak wavelength, wherein the base scintillation light has a base prompt time component and a base delayed time component, wherein an intensity of the base prompt time component and an intensity of the base delayed time component provide information so as to allow distinguishing between base scintillation light created by fast neutrons and base scintillation light created by gamma rays;
  primary fluorescent dye molecules dissolved in the matrix material, wherein the primary fluorescent dye molecules absorb the base scintillation light and emit primary scintillation light, wherein the primary scintillation light has a primary peak wavelength, wherein the primary peak wavelength is longer than the base peak wavelength; and
  a metal salt dissolved in the matrix material, wherein selected metal nuclei of the metal salt capture a thermal neutron incident on the scintillation system and produce base scintillation light, wherein the intensity of the base scintillation prompt time component and the intensity of the base scintillation delayed time component allow detection of the thermal neutron captured by the selected metal nuclei of the metal salt.

Embodiment 46

The scintillation system according to embodiment 45, further comprising:
secondary fluorescent dye molecules dissolved in the matrix material, wherein the secondary fluorescent dye molecules absorb the primary scintillation light and emit secondary scintillation light, wherein the secondary scintillation light has a secondary peak wavelength, wherein the secondary peak wavelength is longer than the primary peak wavelength.

Embodiment 47

A scintillation system for detecting incident radiation, comprising:
a scintillator composition, wherein the scintillator composition comprises:
  a matrix material;
  base fluorescent dye molecules dissolved in the matrix material, wherein the matrix material with the base fluorescent dye molecules dissolved therein comprises two base chromophores, wherein the two base chromophores are covalently bonded to one another, wherein the two base chromophores produce base scintillation light upon excitation, wherein the base scintillation has a base peak wavelength, wherein the base scintillation light has a base prompt time component and a base delayed time component, wherein an intensity of the base prompt time component and an intensity of the base delayed time component provide information so as to allow distinguishing between base scintillation light created by fast neutrons and base scintillation light created by gamma rays; and
  organo metallic molecules dissolved in the matrix material, wherein a density and average atomic number of the scintillator composition is such that the scintillator composition is capable of containing a total energy of at least a portion of gamma rays incident on the scintillator system, wherein containing the total energy of a gamma ray incident on the scintillation system in the scintillator composition allows a determination of the total energy of the gamma ray incident on the scintillation system from an intensity of the base scintillation light.

Embodiment 48

The scintillation system according to embodiment 47, further comprising:
a metal salt dissolved in the matrix material, wherein selected metal nuclei of the metal salt capture a thermal neutron incident on the scintillation system and produce base scintillation light, wherein the intensity of the base scintillation prompt time component and the intensity of the base scintillation delayed time component allow detection of the thermal neutron captured by the selected metal nuclei of the metal salt.

Embodiment 49

A scintillation system for detecting incident radiation, comprising:
a scintillator composition, wherein the scintillator composition comprises:
  a matrix material;
  base fluorescent dye molecules dissolved in the matrix material, wherein the matrix material with the base fluorescent dye molecules dissolved therein comprises two base chromophores, wherein the two base chromophores are covalently bonded to one another, wherein the two base chromophores produce base scintillation light upon excitation, wherein the base scintillation has a base peak wavelength, wherein the base scintillation light has a base prompt time component and a base delayed time component, wherein an intensity of the base prompt time component and an intensity of the base delayed time component provide information so as to allow distinguishing between base scintillation light created by fast neutrons and base scintillation light created by gamma rays; and a metal salt dissolved in the matrix material, wherein selected metal nuclei of the metal salt capture a thermal neutron incident on the scintillation system and produce base scintillation light, wherein the intensity of the base scintillation prompt time component and the intensity of the base scintillation delayed time component allow detection of the thermal neutron captured by the selected metal nuclei of the metal salt.

Embodiment 50

A scintillation system for detecting incident radiation, comprising:
a scintillator composition, wherein the scintillator composition comprises:
a matrix material;
base fluorescent dye molecules dissolved in the matrix material, wherein the matrix material with the base fluorescent dye molecules dissolved therein comprises dimers of the base fluorescent dye molecules, wherein the dimmers of the base fluorescent dye molecules comprises two base chromophores, wherein the two base chromophores produce base scintillation light upon excitation, wherein the base scintillation has a base peak wavelength, wherein the base scintillation light has a base prompt time component and a base delayed time component, wherein an intensity of the base prompt time component and an intensity of the base delayed time component provide information so as to allow distinguishing between base scintillation light created by fast neutrons and base scintillation light created by gamma rays; and
organo metallic molecules dissolved in the matrix material, wherein a density and average atomic number of the scintillator composition is such that the scintillator composition is capable of containing a total energy of at least a portion of gamma rays incident on the scintillator system, wherein containing the total energy of a gamma ray incident on the scintillation system in the scintillator composition allows a determination of the total energy of the gamma ray incident on the scintillation system from an intensity of the base scintillation light.

Embodiment 51

The scintillation system according to embodiment 50, further comprising:
a metal salt dissolved in the matrix material, wherein selected metal nuclei of the metal salt capture a thermal neutron incident on the scintillation system and produce base scintillation light, wherein the intensity of the base scintillation prompt time component and the intensity of the base scintillation delayed time component allow detection of the thermal neutron captured by the selected metal nuclei of the metal salt.

Embodiment 52

A scintillation system for detecting incident radiation, comprising:
a scintillator composition, wherein the scintillator composition comprises:
a matrix material;
base fluorescent dye molecules dissolved in the matrix material, wherein the matrix material with the base fluorescent dye molecules dissolved therein comprises dimers of the base fluorescent dye molecules, wherein the dimers of the base fluorescent dye molecules comprises two base chromophores, wherein the two base chromophores produce base scintillation light upon excitation, wherein the base scintillation has a base peak wavelength, wherein the base scintillation light has a base prompt time component and a base delayed time component, wherein an intensity of the base prompt time component and an intensity of the base delayed time component provide information so as to allow distinguishing between base scintillation light created by fast neutrons and base scintillation light created by gamma rays; and
a metal salt dissolved in the matrix material, wherein selected metal nuclei of the metal salt capture a thermal neutron incident on the scintillation system and produce base scintillation light, wherein the intensity of the base scintillation prompt time component and the intensity of the base scintillation delayed time component allow detection of the thermal neutron captured by the selected metal nuclei of the metal salt.

Embodiment 53

The scintillation system according to embodiments 50 to 52, wherein the base fluorescent dye molecules comprises pyrene and derivatives thereof.

Embodiment 54

A method for detecting incident fast neutron radiation from a radiation source, comprising:
positioning a scintillation system of any of embodiments 1-53 in a region of interest;
receiving the scintillation light; and
determining from the received scintillation light whether fast neutrons were incident on the scintillation system.

Embodiment 55

A method for detecting incident fast neutrons and gamma rays from a radioactive source, comprising:
positioning a scintillation system of any of embodiments 1-53 in a region of interest;
wherein the scintillator composition comprises organo metallic molecules with concentration in the range 10 to 50% wt/wt;
determining from the received scintillation light whether fast neutrons were incident on the scintillation system, wherein the prompt and delayed light intensities of the received scintillation light from the scintillator composition are used to detect and identify the incident fast neutrons and discriminate against the gamma rays;
further comprising, determining whether a gamma ray was incident on the scintillation system, wherein the prompt and delayed light intensities of the received scintillation light from the scintillator composition are used to detect and identify the incident gamma rays, measure the energy of the incident gamma rays, and discriminate against the fast neutrons.

Embodiment 56

A method for detecting incident fast neutrons, thermal neutrons, and gamma rays from a radioactive source, comprising: positioning a scintillation system of any of embodiments 1-53 in a region of interest;
  wherein the scintillator composition comprises a lithium salt compound;
  determining from the received scintillation light whether fast and/or thermal neutrons were incident on the scintillation system, wherein the received scintillation light from the scintillator composition can be used to detect both the incident fast neutrons and detect and measure the energy of the incident gamma rays,
  further comprising, determining whether a gamma ray was incident on the scintillation system, wherein the received prompt and delayed scintillation light from the scintillator composition can be used to detect and identify the nuclear fragments resulting from thermal neutron capture by Lithium-6.

Embodiment 57

A method for detecting incident thermal neutrons from a radioactive source comprising: positioning a scintillation system of any of embodiments 1-53 in a region of interest, wherein the scintillating system comprises:
  a set of tubes containing the scintillating material composition whose scintillation light is detected by high quantum efficiency solid state photosensitive devices,
  wherein the scintillator composition also contains a lithium salt compound, and
  wherein the received prompt and delayed scintillation light from the material composition can be used to detect and identify the nuclear fragments resulting thermal neutron capture by Lithium-6.

Embodiment 58

The method according to embodiment 57, wherein the lithium salt compound is enriched to contain at least 50% wt/wt of Lithium-6.

Embodiment 59

The method according to embodiment 57, wherein the lithium salt compound is enriched to contain at least 75% wt/wt of Lithium-6.

Embodiment 60

The method according to embodiment 57, wherein the lithium salt compound is enriched to contain at least 90% wt/wt of Lithium-6.

Various changes and modifications within the spirit and scope of the invention will become apparent to those skilled in the art from this description and by practice of the invention.

Aspects of the invention may be described in the context of a variety of shapes and sizes of the scintillating polar organic materials. Different types of photo-electric sensitive detectors are employed to detect the prompt and delayed scintillation light produced in, and emanating from the material. The analogue electrical pulses from these photo sensitive devices are digitized and time-stamped. The digital data can be analyzed.

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A scintillation system for detecting incident radiation, comprising:
  a scintillator composition, wherein the scintillator composition comprises:
  a matrix material;
  base fluorescent dye molecules dissolved in the matrix material, wherein the matrix material with the base fluorescent dye molecules dissolved therein comprises base chromophores, wherein the base chromophores have a base chromophore average nearest neighbor distance in the range 0.5 to 12 Angstroms, wherein the base chromophores produce base scintillation light upon excitation, wherein the base scintillation has a base peak wavelength, wherein the base scintillation light has a base prompt time component and a base delayed time component, and wherein an intensity of the base prompt time component and an intensity of the base delayed time component provide information so as to allow distinguishing between base scintillation light created by fast neutrons and base scintillation light created by gamma rays;
  primary fluorescent dye molecules dissolved in the matrix material, wherein the primary fluorescent dye molecules absorb the base scintillation light and emit primary scintillation light, wherein the primary scintillation light has a primary peak wavelength, and wherein the primary peak wavelength is longer than the base peak wavelength; and
  organo metallic molecules dissolved in the matrix material, wherein a density and average atomic number of the scintillator composition is such that the scintillator composition is capable of containing a total energy of at least a portion of gamma rays incident on the scintillator system, and wherein containing the total energy of a gamma ray incident on the scintillation system in the scintillator composition allows a determination of the total energy of the gamma ray incident on the scintillation system from an intensity of the base scintillation light.

2. The scintillation system according to claim 1, further comprising:
a metal salt dissolved in the matrix material, wherein selected metal nuclei of the metal salt capture a thermal neutron incident on the scintillation system and produce base scintillation light, and wherein the intensity of the base scintillation prompt time component and the intensity of the base scintillation delayed time component allow detection of the thermal neutron captured by the selected metal nuclei of the metal salt.

3. The scintillation system according to claim 2, further comprising:
secondary fluorescent dye molecules dissolved in the matrix material, wherein the secondary fluorescent dye molecules absorb the primary scintillation light and emit secondary scintillation light, wherein the secondary scintillation light has a secondary peak wavelength, and wherein the secondary peak wavelength is longer than the primary peak wavelength.

4. The scintillation system according to claim 2, wherein the metal salt comprises one or more compounds selected from the group consisting of: lithium chloride, lithium nitrate, lithium salicylate, and compounds containing metal moieties with large neutron capture cross-sections, boron, and gadolinium.

5. The scintillation system according to claim 4, wherein the metal salt comprises one or more lithium compounds, and wherein the lithium compounds are dissolved in the matrix material such that a lithium ion concentration is in the range 0.1% to 2.0% wt/wt.

6. The scintillation system according to claim 5, wherein the metal salt comprises a lithium salt, and wherein the lithium salt has an enhanced concentration of the Li-6 isotope.

7. A method for detecting incident fast neutrons, thermal neutrons, and gamma rays from a radioactive source, comprising:
positioning a scintillation system of claim 2 in a region of interest;
wherein the scintillator composition comprises a lithium salt compound, and wherein the lithium salt compound contains Lithium-6;
receiving the primary scintillation light;
determining from the received primary scintillation light whether fast and/or thermal neutrons were incident on the scintillation system, wherein the received primary scintillation light from the scintillator composition can be used to detect both the incident fast neutrons and detect and measure the energy of the incident gamma rays,
further comprising, determining whether a gamma ray was incident on the scintillation system, wherein the received prompt and delayed scintillation light from the scintillator composition can be used to detect and identify the nuclear fragments resulting from thermal neutron capture by Lithium-6.

8. The scintillation system according to claim 1, further comprising:
secondary fluorescent dye molecules dissolved in the matrix material, wherein the secondary fluorescent dye molecules absorb the primary scintillation light and emit secondary scintillation light, wherein the secondary scintillation light has a secondary peak wavelength, and wherein the secondary peak wavelength is longer than the primary peak wavelength.

9. The scintillation system according to claim 8, wherein the secondary peak wavelength is a visible wavelength.

10. The scintillation system according to claim 8, further comprising a receiver, wherein the receiver receives and analyzes the secondary scintillation light from the scintillator composition, and wherein the receiver determines whether a thermal neutron interacted in the scintillation system.

11. The scintillation system according to claim 8, wherein the primary fluorescent dye molecules dissolved in the matrix material have an optical absorption overlapping with the emission maximum of the base fluorescent dye molecules, and wherein a concentration of the primary dye molecules is in the range 0.1 to 3.5% wt/wt.

12. The scintillation system according to claim 11, wherein the primary fluorescent dye molecules comprises one or more dyes selected from the group consisting of: diphenylanthracene and bis-MSB.

13. The scintillation system according to claim 12, wherein the secondary fluorescent dye molecules comprises one or more dyes selected from the group consisting of: a coumarin dye and a rhodamine dye, and wherein a concentration of the secondary fluorescent dye molecules is in the range 0.001 to 0.05% wt/wt.

14. The scintillation system according to claim 1, further comprising a receiver, wherein the receiver receives and analyzes the primary scintillation light from the scintillator composition and determines whether a gamma ray was incident on the scintillation system.

15. The scintillation system according to claim 14, wherein the receiver further determines the total energy of the gamma ray incident on the scintillation system.

16. The scintillation system according to claim 1, further comprising a receiver, wherein the receiver receives and analyzes the primary scintillation light from the scintillator composition, and wherein the receiver determines whether a fast neutron was incident on the scintillation system.

17. The scintillation system according to claim 16, wherein the receiver further determines an energy of recoil of one or more protons produced by the incident fast neutron.

18. The scintillation system according to claim 1, wherein the matrix material is a solid polymer, a liquid, a viscous liquid, a gel polymer, or a combination thereof.

19. The scintillation system according to claim 1, wherein the matrix material is sufficiently transparent to base scintillation light such that an attenuation length of the base scintillation light at the base peak wavelength is at least 0.5 m.

20. The scintillation system according to claim 1, wherein the matrix material is sufficiently transparent to base scintillation light such that an attenuation length of the base scintillation light at the base peak wavelength is at least 1.0 m.

21. The scintillation system according to claim 1, wherein the matrix material is sufficiently transparent to base scintillation light such that an attenuation length of the base scintillation light at the base peak wavelength is at least 1.5 m.

22. The scintillation system according to claim 21, wherein the matrix material is a cross-linked polymeric material.

23. The scintillation system according to claim 1, wherein the matrix material is a solid polymer, wherein the solid polymer is an amorphous, solid polymeric material with glass transition temperature higher than 75° C.

24. The scintillation system according to claim 23, wherein the solid polymer comprises one or more materials selected from the group consisting of: polystyrene, polyvinyl toluene, polyvinyl xylene, polyvinyl naphthalene, polyvinylacenaphthylene, polyvinylbiphenyl, polyvinylcarbazole, polyvinyldimethyl styrene, polyvinyltrimethylstyrene, polyvinylfluorene, and cyclic olefine copolymers.

25. The scintillation system according to claim 23, wherein the solid polymer is polar and comprises one or more materials selected from the group consisting of: polyvinylpyrrolidone, polyvinylimidazolidone, polyvinylsulfoxide and alkyl substituted compounds thereof.

26. The scintillation system according to claim 1, wherein the matrix material is a liquid with melting point below 20° C., flash point above 90° C., low toxicity, and wherein the liquid is capable of dissolving a highly polar metal salt, aromatic organic dyes, and an organo-metallic compound.

27. The scintillation system according to claim 26, wherein the liquid comprises one or more materials selected from the group consisting of: highly polar solvents, methyl pyrrolidone (N-MP), dimethyl imidazolidone (DMI), dimethyl sulfoxide (DMSO), and derivatives thereof.

28. The scintillation system according to claim 27, wherein the matrix material is a polar liquid, wherein 1-3 percent wt/wt of a very high molecular weight soluble polymer is dissolved in the polar liquid, and wherein the very high molecular weight soluble polymer increases a viscosity of the polar liquid by a factor in the range of 2 to 1000.

29. The scintillation system according to claim 1, wherein the matrix material is a highly viscous liquid, and wherein the matrix material is contained in a mechanical structure.

30. The scintillation system according to claim 1, wherein the matrix material is a gel comprising a viscous liquid and a three-dimensional cross-linked polymeric network, and wherein the gel does not flow.

31. The scintillation system according to claim 30, wherein the viscous liquid is selected from the group consisting of: a polar liquid, N-MP, and DMI, wherein the three-dimensional cross-linked polymeric network is selected from the group consisting of: linear and cross-linkable polymers based on polyvinylpyrrolidone (PVP) and polyvinylimidazolidone (PVI).

32. The scintillation system according to claim 31, wherein the gel is contained in a mechanical structure.

33. The scintillation system according to claim 1, wherein the matrix material is selected from the group consisting of: a gel, a high glass transition temperature solid polymer, and a cross linked polar solid polymer.

34. The scintillation system according to claim 1, wherein the base fluorescent dye molecules are aromatic dye molecules, and wherein the base fluorescent dye molecules have a concentration in the range 0.3 to 3.5 mol/L.

35. The scintillation system according to claim 1, wherein the base fluorescent dyes comprises one or more dyes selected from the group of consisting of: pseudocumene, single ring aromatic compounds, and derivatives thereof.

36. The scintillation system according to claim 1, wherein the base fluorescent dyes comprise one or more dyes selected from the group of consisting of: diisopropyl naphthalene, two ring aromatic compounds, and derivatives thereof.

37. The scintillation system according to claim 1, wherein the base fluorescent dyes comprises one or more dyes selected from the group consisting of: p-terphenyl, 2,5 diphenyloxazole (PPO), dibenzofuran (PPF), and derivatives thereof, selected from the group of 3 ring aromatic compounds.

38. The scintillation system according to claim 1, wherein the organo metallic molecules comprises one or more compounds selected from the group consisting of: tetramethyl tin, triphenyl bismuth, essentially covalent rather than ionic organo-metallic compounds, and derivatives thereof.

39. The scintillation system according to claim 1, wherein the matrix material has less than $10^{-4}$ wt/wt of oxygen dissolved therein.

40. The scintillation system according to claim 1, wherein the matrix material has less than $10^{-5}$ wt/wt of oxygen dissolved therein.

41. The scintillation system according to claim 1, wherein the matrix material has less than $10^{-3}$ wt/wt of water dissolved therein.

42. The scintillation system according to claim 1, wherein the scintillation system provides information sufficient to identify and measure the energy of a gamma ray such that the full width at half maximum of the energy spectrum is better than 15% of the energy at 0.662 MeV.

43. The scintillation system according to claim 1, wherein the scintillation system provides information to identify a fast neutron scatter from a proton event and discriminate against a gamma scatter from an electron with a factor of at least 300:1.

44. The scintillation system according to claim 1, wherein an energy spectrum of fast neutrons can be determined from a distribution of energy depositions of incident fast neutrons.

45. The scintillation system according to claim 1, wherein the scintillation system provides information to identify a slow or thermal neutron which is captured by 6-Lithium and discriminates against a gamma ray interaction with a ratio of at least $10^4$:1.

46. A method for detecting incident fast neutron radiation from a radiation source, comprising:
   positioning a scintillation system of claim 1 in a region of interest;
   receiving the primary scintillation light; and
   determining from the received primary scintillation light whether fast neutrons were incident on the scintillation system.

47. A method for detecting incident fast neutrons and gamma rays from a radioactive source, comprising:
   positioning a scintillation system of claim 1 in a region of interest,
   receiving the primary scintillation light;
   wherein the scintillator composition comprises organo metallic molecules with concentration in the range 10 to 50% wt/wt;
   determining from the received primary scintillation light whether fast neutrons were incident on the scintillation system, wherein the prompt and delayed light intensities of the received primary scintillation light from the scintillator composition are used to detect and identify the incident fast neutrons and discriminate against the gamma rays; and
   determining whether a gamma ray was incident on the scintillation system, wherein the prompt and delayed light intensities of the received primary scintillation light from the scintillator composition are used to detect and identify the incident gamma rays, measure the total energy of the incident gamma rays, and discriminate against the fast neutrons.

48. A method for detecting incident thermal neutrons from a radioactive source comprising:
   positioning a scintillation system of claim 1 in a region of interest,
   wherein the scintillating system comprises:
      a set of tubes containing the scintillation composition,
      wherein the scintillator composition also contains comprises a lithium salt compound, and wherein the lithium salt compound contains Lithium-6; and receiving the primary scintillation light such that the primary scintillation light is detected by high quantum efficiency solid state photosensitive devices, wherein the prompt and delayed light intensities of the received primary scintillation light from the scintillation composition can be used to detect and identify the nuclear fragments resulting from thermal neutron capture by Lithium-6.

49. The method according to claim 48, wherein the lithium salt compound is enriched to contain at least 50% wt/wt of Lithium-6.

50. The method according to claim 48, wherein the lithium salt compound is enriched to contain at least 75% wt/wt of Lithium-6.

51. The method according to claim 48, wherein the lithium salt compound is enriched to contain at least 90% wt/wt of Lithium-6.

52. A scintillation system for detecting incident radiation, comprising:

a scintillator composition, wherein the scintillator composition comprises:

a matrix material;

base fluorescent dye molecules dissolved in the matrix material, wherein the matrix material with the base fluorescent dye molecules dissolved therein comprises base chromophores, wherein the base chromophores have a base chromophore average nearest neighbor distance in the range 0.5 to 12 Angstroms, wherein the base chromophores produce base scintillation light upon excitation, wherein the base scintillation has a base peak wavelength, wherein the base scintillation light has a base prompt time component and a base delayed time component, and wherein an intensity of the base prompt time component and an intensity of the base delayed time component provide information so as to allow distinguishing between base scintillation light created by fast neutrons and base scintillation light created by gamma rays;

primary fluorescent dye molecules dissolved in the matrix material, wherein the primary fluorescent dye molecules absorb the base scintillation light and emit primary scintillation light, wherein the primary scintillation light has a primary peak wavelength, and wherein the primary peak wavelength is longer than the base peak wavelength; and a metal salt dissolved in the matrix material, wherein selected metal nuclei of the metal salt capture a thermal neutron incident on the scintillation system and produce base scintillation light, and wherein the intensity of the base scintillation prompt time component and the intensity of the base scintillation delayed time component allow detection of the thermal neutron captured by the selected metal nuclei of the metal salt.

53. The scintillation system according to claim 52, further comprising:

secondary fluorescent dye molecules dissolved in the matrix material, wherein the secondary fluorescent dye molecules absorb the primary scintillation light and emit secondary scintillation light, wherein the secondary scintillation light has a secondary peak wavelength, and wherein the secondary peak wavelength is longer than the primary peak wavelength.

54. A scintillation system for detecting incident radiation, comprising:

a scintillator composition, wherein the scintillator composition comprises:

a matrix material;

base fluorescent dye molecules dissolved in the matrix material, wherein the matrix material with the base fluorescent dye molecules dissolved therein comprises two base chromophores, wherein the two base chromophores are covalently bonded to one another, wherein the two base chromophores produce base scintillation light upon excitation, wherein the base scintillation has a base peak wavelength, wherein the base scintillation light has a base prompt time component and a base delayed time component, and wherein an intensity of the base prompt time component and an intensity of the base delayed time component provide information so as to allow distinguishing between base scintillation light created by fast neutrons and base scintillation light created by gamma rays; and organo metallic molecules dissolved in the matrix material, wherein a density and average atomic number of the scintillator composition is such that the scintillator composition is capable of containing a total energy of at least a portion of gamma rays incident on the scintillator system, and wherein containing the total energy of a gamma ray incident on the scintillation system in the scintillator composition allows a determination of the total energy of the gamma ray incident on the scintillation system from an intensity of the base scintillation light.

55. The scintillation system according to claim 54, further comprising:

a metal salt dissolved in the matrix material, wherein selected metal nuclei of the metal salt capture a thermal neutron incident on the scintillation system and produce base scintillation light, and wherein the intensity of the base scintillation prompt time component and the intensity of the base scintillation delayed time component allow detection of the thermal neutron captured by the selected metal nuclei of the metal salt.

56. A scintillation system for detecting incident radiation, comprising:

a scintillator composition, wherein the scintillator composition comprises:

a matrix material;

base fluorescent dye molecules dissolved in the matrix material, wherein the matrix material with the base fluorescent dye molecules dissolved therein comprises two base chromophores, wherein the two base chromophores are covalently bonded to one another, wherein the two base chromophores produce base scintillation light upon excitation, wherein the base scintillation has a base peak wavelength, wherein the base scintillation light has a base prompt time component and a base delayed time component, and wherein an intensity of the base prompt time component and an intensity of the base delayed time component provide information so as to allow distinguishing between base scintillation light created by fast neutrons and base scintillation light created by gamma rays; and a metal salt dissolved in the matrix material, wherein selected metal nuclei of the metal salt capture a thermal neutron incident on the scintillation system and produce base scintillation light, and wherein the intensity of the base scintillation prompt time component and the intensity of the base scintillation delayed time component allow detection of the thermal neutron captured by the selected metal nuclei of the metal salt.

57. A scintillation system for detecting incident radiation, comprising:
a scintillator composition, wherein the scintillator composition comprises:
a matrix material;
base fluorescent dye molecules dissolved in the matrix material, wherein the matrix material with the base fluorescent dye molecules dissolved therein comprises dimers of the base fluorescent dye molecules, wherein the dimers of the base fluorescent dye molecules comprise two base chromophores, wherein the two base chromophores produce base scintillation light upon excitation, wherein the base scintillation has a base peak wavelength, wherein the base scintillation light has a base prompt time component and a base delayed time component, and wherein an intensity of the base prompt time component and an intensity of the base delayed time component provide information so as to allow distinguishing between base scintillation light created by fast neutrons and base scintillation light created by gamma rays; and
organo metallic molecules dissolved in the matrix material, wherein a density and average atomic number of the scintillator composition are such that the scintillator composition is capable of containing a total energy of at least a portion of gamma rays incident on the scintillator system, and wherein containing the total energy of a gamma ray incident on the scintillation system in the scintillator composition allows a determination of the total energy of the gamma ray incident on the scintillation system from an intensity of the base scintillation light.

58. The scintillation system according to claim 57, further comprising:
a metal salt dissolved in the matrix material, wherein selected metal nuclei of the metal salt capture a thermal neutron incident on the scintillation system and produce base scintillation light, and wherein the intensity of the base scintillation prompt time component and the intensity of the base scintillation delayed time component allow detection of the thermal neutron captured by the selected metal nuclei of the metal salt.

59. The scintillation system according to claim 57, wherein the base fluorescent dye molecules comprises pyrene and derivatives thereof.

60. A scintillation system for detecting incident radiation, comprising:
a scintillator composition, wherein the scintillator composition comprises:
a matrix material;
base fluorescent dye molecules dissolved in the matrix material, wherein the matrix material with the base fluorescent dye molecules dissolved therein comprises dimers of the base fluorescent dye molecules, wherein the dimers of the base fluorescent dye molecules comprise two base chromophores, wherein the two base chromophores produce base scintillation light upon excitation, wherein the base scintillation has a base peak wavelength, wherein the base scintillation light has a base prompt time component and a base delayed time component, and wherein an intensity of the base prompt time component and an intensity of the base delayed time component provide information so as to allow distinguishing between base scintillation light created by fast neutrons and base scintillation light created by gamma rays; and
a metal salt dissolved in the matrix material, wherein selected metal nuclei of the metal salt capture a thermal neutron incident on the scintillation system and produce base scintillation light, and wherein the intensity of the base scintillation prompt time component and the intensity of the base scintillation delayed time component allow detection of the thermal neutron captured by the selected metal nuclei of the metal salt.

\* \* \* \* \*